United States Patent Office 3,100,308
Patented Aug. 13, 1963

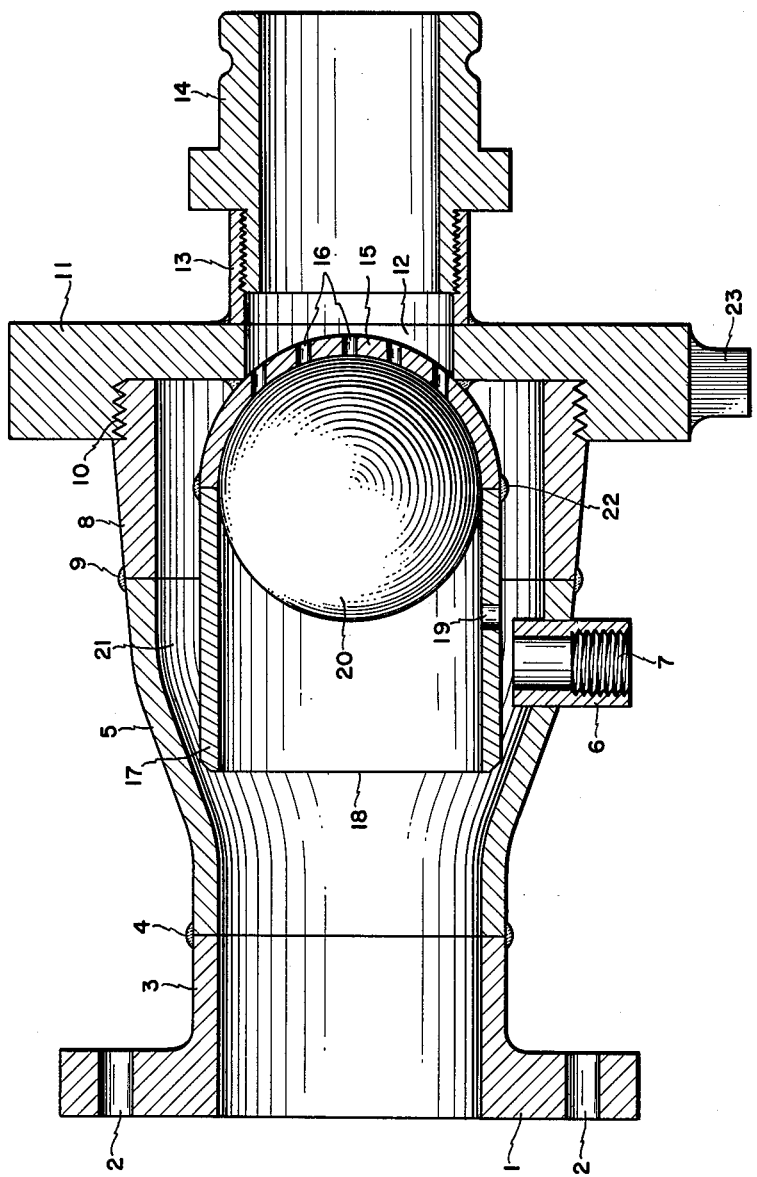
Vincent A. De Sena Inventor
By Henry Berk
Patent Attorney

3,100,308
COMBINATION FLEXIBLE HOSE CONNECTION
AND BALL PIG LAUNCHER-RECEIVER
Vincent A. De Sena, Fanwood, N.J., assignor to Esso
Research and Engineering Company, a corporation of
Delaware
Filed July 17, 1962, Ser. No. 210,413
3 Claims. (Cl. 15—104.06)

This invention relates to a device useful for placing ball pigs in position for launching into a pipeline and for receiving ball pigs that have passed through the pipeline.

The term "ball pig" refers to a spherical body of solid or inflatable rubbery material which cleans out pipelines or separates two or more different fluids during pumping operations. In either case, the ball pig is forced through the pipeline, a cleaning or separating as required. Generally, the ball pig has a diameter slightly larger than the internal diameter of the pipeline and acts as a free plunger as it is driven by fluid (liquid or air) pressure through the length of pipeline.

Prior to the present invention, ball pigs were used in pipelines with difficulties in insertion and removal of the ball pigs into the pipeline. The present invention provides an improved device and technique for launching and receiving the ball pigs, and in doing so eliminates the main difficulties that have been experienced heretofore. The device is easily constructed from available pipe fittings.

A ball pig is spherical and usually made of a rubbery material, such as polychloroprene, commercially available as Neoprene. It may be solid or inflatable and is slightly larger in diameter than the inside diameter of the pipeline to be "pigged." "Pigging" the pipeline is a term used to describe an operation where a pig is inserted into a pipeline for separation of products or when the pipeline is to be completely emptied of fluid or coating debris from the inner walls of a pipeline, e.g. 3", 4", 6" or larger in diameter. The ball effectively squeegees the pipe walls as it passes through the pipeline. A uniform fluid pressure on one side of the ball moves it forward against inertia and resistance when the ball is properly started on its way into the pipeline.

In accordance with the present invention, a device which functions for launching the ball into the pipeline and receiving it is made for convenient installation, suitable control of pressures, and safe handling. This device is made up of two main units. One unit (the launcher-receiver) guides the ball into and out of the other unit (the pig trap housing) which is attached to the end of the pipeline. The pig trap housing has a pressure relief connection and is constructed in such a fashion that the open end is oversized and male threaded for quick coupling with the launcher-receiver which positions the ball for launching or acts as the trap for receiving the ball. This unit is constructed in such a fashion as to allow flexible hose connections for fluid delivery through the entire unit as assembled (see attached drawing). The two units or their parts can be made of suitable strong metal, e.g. malleable iron or steel, by casting or forging.

A simple instruction and method of fabrication will be described with reference to the diagrammatic drawing which shows the device in longitudinal cross-section.

The device illustrated in the drawing is not in exact proportions, but the relative size of the parts sufficiently illustrate a device suitable for launching and receiving ball pigs through a 4" internal diameter pipeline.

The mouth of the trap housing is the 4" weld neck flange 1 which can be bolted to a flanged open end or flanged valve end of a pipeline of the same internal diameter using the bolt holes 2 in the flange for inserting the bolt or screw attaching means.

The narrowed neck wall portion 3 of the flange 1 is butt welded around its circumference at 4 to be converged to a 6" x 4" concentric reducer 5 which forms the ball pig trap housing. A ¾" coupling 6 is welded onto the concentric reducer 5. The coupling 6 should have an inner threading 7 for receiving a nipple or threaded pipe. This fitting is used to relieve pressure from the pipeline when the pig trap is to be opened.

The concentric reducer 5, at its wide end opening, is welded to a male threaded 10 section of a 6" cap union 8 at the welded junction 9. The union 8 makes a screw fitting with the female threading in the cover 11. The cover which forms the base of the launcher-receiver is fabricated from a female threaded section of a 6" fitting known as a blanking cap union. The cover is, in general, a solid disc shape which may have a means 23 for use in applying a wrench. For purposes of this device, a 3" bore hole 12 is made in the center of the cover 11. A 3" female threaded pipe connection 13 is welded to the cover over the 3" bore on the outside face of the cover. This connection 13 receives a 3" nipple 14 for snap-on hose service through which compressed air or compressed fluid is passed into the bore 12.

The ball pig launcher-receiver consists of a bowl-shaped or cup-shaped weld cap 15 drilled with seven ¾" holes 16 within a 3" circle. This cup, on its convex surface, is welded over the bore hole 12 on the inside face of the cover so that the drilled holes permit passage of pressure fluid from a flexible hose connected to the nipple 14. A short cylindrical pipe length 17 is welded at 22 to the rim of the cup 15 to provide a guiding sleeve for the ball pigs. The sleeve 17 has a nominal 4" internal diameter, i.e. the same diameter as the pipe which is to be cleaned. The length of the sleeve from its rim 18 to the inside bottom face of the cup 15 is 6⅛"±⅛".

A small ⅜" vent hole 19 is provided in the side of the sleeve 17 for release of air pressure when the ball pig is being ejected from the cup 15 past this vent hole.

It is to be noted that the overall assembly of the cup 15 with its sleeve 17 is welded to the inside base of the blank cover 11 which screws on to the male threading 10 and can be easily removed therefrom with the attached pipe connection 13 and the nipple 14. The removal of this assembly from the trap housing is a step carried out in recovering the ball pig in the receiving cup 15. With the trap assembly removed from its housing, fluid pressure can be applied from a flexible hose through the nipple 14, through the holes 16, to discharge the ball from the cup. As the ball is being projected from the cup 15 past the venting hole 19, the fluid then becomes vented through the vent hole 19 so that the ball pig is not thrown out of the sleeve 17. By manually covering the vent hole 19, the ejection of the ball from the sleeve 17 is controlled.

In using the device described for launching a ball pig into and through a pipeline which is to be cleaned, the device is fastened onto the pipeline at the end of the wall the ball pig is to enter the pipeline. This fastening may be screw or bolt fastening using the bolt holes 2 in the flange 1. The ball pig 20 is initially in the position indicated, i.e. lodged in the bottom of the cup 15. The oversized housing 5 and 8 for the cup 15 and its sleeve attached allows easy insertion of the cup with its sleeve attachment with the ball within the cup. The exterior surface of the sleeve 17 is spaced from the inner surface of the housing concentrically therewith and in a position to guide the ball into the pipeline when the propelling fluid enters through the drilled holes 16. In this launching procedure, the pressure surrounding the cup 15 and the sleeve 17 in the space 21 is not built up until the ball has been practically expelled past the sleeve of rim 18 so that the ball is then well on its way into the pipeline. In this manner, the propelling fluid is kept from by-passing around the ball.

When the device is being used at the exit end of the pipeline to receive the ball, fluid ahead of the ball is permitted to leave the pipeline through the holes 16 in the cup 15, then through the nipple 13, and lastly through the hose connection 14 where a hose directs the fluid into appropriate other pipelines or vessels. When all the fluid is out of the pigged line, the ball seats in the cup. The side outlet connection 6 is then used to relieve pressure behind the ball which is caught in the cup 15. The sealing effect of the ball in the cup provides a positive shut-off to the passages of the drilled holes 16. When pigging operations employ compressed air as the propelling force of the pig, the ball prevents by-passing of air into piping systems where air is undesirable, e.g. pump suctions, meter runs, package filling machines, etc.

When pressure is reduced to atmospheric pressure, the cover assembly, including the cup containing the ball, can then be easily removed. The device described is designed to receive two ball pigs sent through a pipeline, as is desired for certain cleaning operations; for example, the first ball would rest at the bottom of the cup 15 and the second ball would then come to rest in the sleeve adjacent to the first ball.

Although it has been shown how the device can be fabricated from commercial pipe fittings, it is possible to fabricate parts of the device as integral fittings without the welding. For example, the housing, which includes the union 8, a concentric reducer 5 and the weld neck flange 1, could be made as one piece. The cup 15 and its sleeve 17 could be made as one piece which would then be made to have the drilling holes 16 and the vent hole 19. The base plate or cover 11 and snap-on hose connections could be made as one piece.

Thus, in a more concise description of the device for launching and receiving a ball pig, it can be considered as comprising, as a unit, a bell-shaped housing (3, 5 and 8) having a narrow end neck portion 3 and outwardly flared wide portion (5 and 8) with means for clamping (flange 2) its ball discharge and receiving end to a pipeline of the same internal diameter as in the neck portion, with a pressure relief outlet coupling (6) in its flared wall, and means at its wide end (threading 10) for fastening to another unit made up of three main parts secured together, namely, the bowl-shaped part (15 and 17) into which the ball fits, the base plate or cover (11) having a threading for fastening to the wide end of the housing, and an outwardly projecting section circumscribing the central perforation of the base plate for attachment to a hose or pipe, or attachment to a nipple which is shaped as a snap-on connection to a flexible hose. The bowl-shaped part is seated on a central hole in the base plate or cover so that spaced smaller holes in the rounded bottom of the bowl-shaped part receive and pass on a plurality of fluid streams from the stream of fluid entering the control hole in the base plate or cover.

The invention described is claimed as follows:

1. A device for launching a ball pig into a pipeline and receiving a ball pig passed through a pipeline by a propelling fluid, comprising a housing having a front end flange for attachment to one end of a pipeline, a front neck cylindrical wall of the housing having an internal diameter equal to that of the pipeline, a fluid outlet connection in a side wall of the housing, a wall of increased internal diameter at the base end of the housing, a bowl-shaped ball pig trap from which extends a cylindrical guiding sleeve spaced from the inner walls of the housing when inserted therein, said guiding sleeve having a nominal diameter of the ball pig and having a fluid vent hole, a base plate having a central hole for passage of propelling fluid over which is seated the bowl-shaped trap having a plurality of spaced holes for receiving and dividing fluid from said central hole into streams, said bowl-shaped trap having its convex surface secured to the base plate at the rim of the central hole in the base plate, means on the base plate for attaching it to the base end of the housing so that the guiding sleeve of the bowl-shaped trap projects in the housing toward its front end in alignment for launching a ball pig through said sleeve and through the front neck of the housing, and a tubular connection on the base plate circumscribing the central hole therein for attachment to a conduit that supplies the propelling fluid from outside the device.

2. A device for launching a ball pig into a pipeline and receiving a ball pig passed through a pipeline by propelling fluid, comprising a bell-shaped housing having a relatively narrow hollow cylindrical neck portion wall at an end that removably attaches to the open end of a pipeline and flared outer wall containing a fluid outlet tube, and which removably attaches at the wider end of the housing to a base plate having a central hole inlet for the propelling fluid, secured to said base plate is a bowl-shaped part having an inner concave wall side into which the ball pig fits with spaced holes through said wall to an outer convex side over said central hole so that fluid passed through said central hole passes in separate streams through the spaced holes, a cylindrical sleeve extending from said bowl-shaped part and having a side vent hole, said cylindrical sleeve being spaced concentrically from flared outer wall of the housing and positioned to guide a ball pig moved by propelling fluid into the open end of the pipeline when the base plate is attached to the wider end of the housing.

3. A device as described in claim 2, in which the base plate has an attached nipple for a snap-on flexible hose connection which leads propelling fluid into the central hole in the base plate toward the spaced holes in the bowl-shaped part.

References Cited in the file of this patent

UNITED STATES PATENTS

| | | |
|---|---|---|
| 2,977,617 | Willis | Apr. 4, 1961 |
| 3,011,196 | Glover | Dec. 5, 1961 |